(12) United States Patent
Shao et al.

(10) Patent No.: US 12,203,799 B2
(45) Date of Patent: Jan. 21, 2025

(54) METHODS AND INDUSTRIAL INTERNET OF THINGS SYSTEMS FOR FACTORY TESTING OF ULTRASONIC GAS METERS FOR SMART PRODUCTION

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Yuefei Wu, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/424,904

(22) Filed: Jan. 29, 2024

(65) Prior Publication Data
US 2024/0167869 A1     May 23, 2024

(30) Foreign Application Priority Data
Dec. 19, 2023   (CN) .......................... 202311745171.2

(51) Int. Cl.
*G01F 25/10*   (2022.01)
*G01F 1/667*   (2022.01)
*H04L 67/12*   (2022.01)

(52) U.S. Cl.
CPC .............. *G01F 25/15* (2022.01); *G01F 1/667* (2013.01); *H04L 67/12* (2013.01)

(58) Field of Classification Search
CPC ................................ G01F 25/15; G01F 25/10
See application file for complete search history.

(56) References Cited

U.S. PATENT DOCUMENTS 5,455,781 A * 10/1995 Reynal .................... G01F 25/13
                                                              700/282
6,453,721 B1 * 9/2002 Grzeslo ................... G01F 15/04
                                                              73/1.01
(Continued)

FOREIGN PATENT DOCUMENTS

CN      101872185 A     10/2010
CN      104181898 A     12/2014
(Continued)

OTHER PUBLICATIONS

Shao, Zehua et al., Perception and Control of Gas Abnormity of IoT Intelligent Gas Meters, Gas & Heat, 2020, 5 pages.
(Continued)

*Primary Examiner* — Tran M. Tran
(74) *Attorney, Agent, or Firm* — METIS IP LLC

(57) ABSTRACT

Embodiments of the present disclosure provide a method and an industrial IoT system for factory testing of an ultrasonic gas meter for smart production. The method may include: obtaining a type of a gas meter to be tested based on the smart production data center; determining at least one reference gas meter based on the type of the gas meter to be tested; determining, based on historical application data of the at least one reference gas meter, predicted application data of the gas meter to be tested; determining an application characteristic based on the predicted application data; determining a predetermined test parameter; issuing a test instruction to test the gas meter to be tested; and obtaining a test result based on the smart production object platform and determining a reliability score of the gas meter to be tested based on the test result and display data of the gas meter to be tested.

20 Claims, 3 Drawing Sheets

(56) References Cited

U.S. PATENT DOCUMENTS

| | | | | |
|---|---|---|---|---|
| 6,560,503 | B1* | 5/2003 | Toprac | G05B 19/41885 700/121 |
| 7,016,750 | B2* | 3/2006 | Steinkirchner | G05B 23/0208 700/121 |
| 7,062,411 | B2* | 6/2006 | Hopkins | H01L 21/67276 714/48 |
| 7,212,953 | B1 | 5/2007 | Artiuch | |
| 7,295,934 | B2* | 11/2007 | Hairston | G01M 3/00 702/140 |
| 7,860,677 | B2* | 12/2010 | Artiuch | G01F 1/05 73/1.16 |
| 8,248,215 | B2* | 8/2012 | Bibelhausen | G01H 1/003 340/506 |
| 8,485,046 | B2* | 7/2013 | Lansing | G01F 1/667 73/861.27 |
| 8,639,464 | B2* | 1/2014 | Artiuch | G01F 25/15 702/45 |
| 9,664,659 | B2* | 5/2017 | Martin | G01F 25/15 |
| 10,488,378 | B2* | 11/2019 | Martin | G01N 33/0006 |
| 10,575,072 | B1* | 2/2020 | Shao | H04Q 9/00 |
| 10,908,012 | B2* | 2/2021 | Bawal | G01F 25/15 |
| 11,042,680 | B2* | 6/2021 | Luo | G06F 30/3323 |
| 11,086,298 | B2* | 8/2021 | Chand | G05B 19/41865 |
| 11,099,486 | B2* | 8/2021 | Ypma | G05B 19/41875 |
| 11,133,955 | B2* | 9/2021 | Silverstein | H04L 12/2825 |
| 11,237,550 | B2* | 2/2022 | Bragg | H04W 4/60 |
| 11,340,591 | B2* | 5/2022 | Chao | G06F 16/907 |
| 11,350,188 | B2* | 5/2022 | Shao | H04W 4/70 |
| 11,398,728 | B2* | 7/2022 | Bain | G06Q 30/0601 |
| 11,473,996 | B2* | 10/2022 | Weiler | G01M 3/2815 |
| 11,616,839 | B2* | 3/2023 | Sharma | G06N 20/00 706/12 |
| 11,619,928 | B1* | 4/2023 | Shao | H04L 67/12 700/28 |
| 11,625,012 | B2* | 4/2023 | Subbloie | G05B 15/02 700/52 |
| 11,681,283 | B1* | 6/2023 | Shao | G05B 19/41875 702/187 |
| 11,687,805 | B2* | 6/2023 | Stubbs | H04L 67/12 706/12 |
| 11,754,995 | B2* | 9/2023 | Shao | H04L 67/12 709/223 |
| 11,774,951 | B2* | 10/2023 | Shao | G05B 19/4185 700/11 |
| 11,833,313 | B2* | 12/2023 | Boudreau | A61M 29/00 |
| 11,860,610 | B2* | 1/2024 | Shao | G05B 19/4185 |
| 11,861,567 | B2* | 1/2024 | Shao | G16Y 10/35 |
| 11,874,650 | B2* | 1/2024 | Shao | G05B 19/41875 |
| 11,921,498 | B2* | 3/2024 | Shao | G05B 19/41875 |
| 11,953,886 | B2* | 4/2024 | Shao | G05B 19/41835 |
| 11,965,769 | B2* | 4/2024 | Collver | G01F 25/10 |
| 11,971,280 | B2* | 4/2024 | Shao | G01F 15/043 |
| 11,996,900 | B2* | 5/2024 | Cella | G06N 3/044 |
| 12,007,251 | B2* | 6/2024 | Shao | G01D 18/00 |
| 12,044,604 | B2* | 7/2024 | Shao | G01N 11/00 |
| 2007/0135957 | A1* | 6/2007 | Ogawa | G05B 23/0243 700/121 |
| 2022/0058747 | A1* | 2/2022 | Crabtree | G06Q 40/08 |
| 2022/0164501 | A1* | 5/2022 | Nosanow | G06N 10/60 |
| 2023/0128973 | A1* | 4/2023 | Kim | B62D 65/022 29/700 |
| 2023/0195058 | A1* | 6/2023 | Cella | G05B 19/4184 700/43 |
| 2024/0012393 | A1* | 1/2024 | Moradian | G05B 19/4184 |
| 2024/0044691 | A1* | 2/2024 | Shukla | G01F 25/10 |

FOREIGN PATENT DOCUMENTS

| | | |
|---|---|---|
| CN | 106441521 A | 2/2017 |
| CN | 107728601 B | 4/2019 |
| CN | 112923985 A | 6/2021 |
| CN | 114964429 A | 8/2022 |
| CN | 115290165 A | 11/2022 |
| CN | 115479652 A | 12/2022 |
| CN | 115790759 A | 3/2023 |
| CN | 115909674 A | 4/2023 |
| CN | 219551653 U | 8/2023 |
| KR | 102008889 B1 | 8/2019 |
| WO | 2022270676 A1 | 12/2022 |
| WO | 2023012742 A1 | 2/2023 |

OTHER PUBLICATIONS

Liang, Pengsong et al., Development of Gas Meter Online Calibration Device and Application System, Urban Gas, 2022, 7 pages.

First Office Action in Chinese Application No. 202311745171.2 mailed on Feb. 6, 2024, 13 pages.

Notification to Grant Patent Right for Invention in Chinese Application No. 202311745171.2 mailed on Feb. 27, 2024, 4 pages.

First Office Action in Chinese Application No. 202311745171.2 mailed on Feb. 6, 2024, 11 pages.

* cited by examiner

METHODS AND INDUSTRIAL INTERNET OF THINGS SYSTEMS FOR FACTORY TESTING OF ULTRASONIC GAS METERS FOR SMART PRODUCTION

CROSS-REFERENCE TO RELATED APPLICATIONS

This application claims priority to Chinese Patent Application No. 202311745171.2, filed on Dec. 19, 2023, the entire contents of which are hereby incorporated by reference.

TECHNICAL FIELD

The present disclosure relates to the field of gas meter testing, and in particular, to a method and an industrial Internet of Things (IoT) system for factory testing of an ultrasonic gas meter for smart production.

BACKGROUND

A gas meter must undergo rigorous testing in accordance with relevant standards before leaving a factory, and may only be put into use after passing the test. Existing technologies often optimize factory testing of a traditional diaphragm gas meter, such as improving testing efficiency, reducing testing costs, etc. The existing technologies involve limited testing for an ultrasonic gas meter, often focusing on routine tests for traditional parameters like a metering error, a sealing performance, an aging resistance, or the like. However, the ultrasonic gas meter has a complex interaction mode. In addition to meeting basic performance standards, factory testing for the ultrasonic gas meter also needs to include data acquisition and communication function tests, such as interference resistance, electromagnetic stability, etc. Moreover, due to the diversity of application scenarios for the ultrasonic gas meter, factory testing of the ultrasonic gas meter must also consider usage requirements of different gas users.

CN107728601 B provides a system for performing integrated testing of a smart gas meter controller. Under the system, a test module may select one or more or all test modules of different functions based on test cases saved under test modules of different functions in an information input when performing an integration test on the smart gas meter controller. The system can meet the testing of different functions of the ultrasonic gas meter. However, the testing is often based on preset generic items, without taking into account user feedback on gas usage, and sometimes, a gas meter that passes the test may not be able to meet usage requirements of a user.

Therefore, some embodiments of the present disclosure provide a method and an industrial Internet of Things (IoT) system for factory testing of the ultrasonic gas meter for smart production, which can adopt different test items in a target manner based on actual usage conditions of the ultrasonic gas meter and enhance user experience.

SUMMARY

To address the issue of determining a scientifically efficient test item, the present disclosure provides a method and an industrial Internet of Things (IoT) system for factory testing of an ultrasonic gas meter for smart production.

The present disclosure provides the method for factory testing of the ultrasonic gas meter for smart production. The method may be implemented by a smart production management platform, the smart production management platform may include a smart production data center, and the method may include: obtaining a type of a gas meter to be tested based on the smart production data center; determining at least one reference gas meter based on the type of the gas meter to be tested; and determining, based on historical application data of the at least one reference gas meter, predicted application data of the gas meter to be tested, wherein the predicted application data may include at least one of a predicted usage environment and a predicted usage intensity and the predicted usage intensity may be determined based on at least one cumulative metering value of the at least one reference gas meter. The method may further include: determining an application characteristic based on the predicted application data; determining a predetermined test parameter, wherein the predetermined test parameter may include a plurality of test items and operating pressure ranges, temperature ranges, and gas flow ranges of the plurality of test items; issuing a test instruction to control a smart production object platform to test the gas meter to be tested, wherein the test instruction may be determined based on the application characteristic and the predetermined test parameter and the test may include at least one of a physicochemical characteristic test and a data transmission test; and obtaining a test result based on the smart production object platform and determining a reliability score of the gas meter to be tested based on the test result and display data of the gas meter to be tested.

The present disclosure provides the industrial IoT system for factory testing of the ultrasonic gas meter for smart production. The industrial IoT system may include a smart production user platform, a smart production service platform, the smart production management platform, a smart production sensing network platform, and the smart production object platform interacting in sequence, wherein the smart production management platform may be configured to perform operations including: obtaining a type of a gas meter to be tested based on the smart production data center; determining at least one reference gas meter based on the type of the gas meter to be tested; and determining, based on historical application data of the at least one reference gas meter, predicted application data of the gas meter to be tested, wherein the predicted application data may include at least one of a predicted usage environment and a predicted usage intensity and the predicted usage intensity may be determined based on at least one cumulative metering value of the at least one reference gas meter. The smart production management platform may be further configured to perform operations including: determining an application characteristic based on the predicted application data; determining a predetermined test parameter, wherein the predetermined test parameter may include a plurality of test items and operating pressure ranges, temperature ranges, and gas flow ranges of the plurality of test items; issuing a test instruction to control a smart production object platform to test the gas meter to be tested, wherein the test instruction may be determined based on the application characteristic and the predetermined test parameter and the test may include at least one of a physicochemical characteristic test and a data transmission test; and obtaining a test result based on the smart production object platform and determining a reliability score of the gas meter to be tested based on the test result and display data of the gas meter to be tested.

The present disclosure comprises a non-transitory computer-readable storage medium storing one or more computer instructions. When a computer reads the one or more computer instructions in the storage medium, the computer executes the method for factory testing of the ultrasonic gas meter for smart production.

The beneficial effects brought about by the present disclosure may include, but are not limited to, that the smart production management platform determines the application characteristic based on the predicted application data, thereby determining the reasonable testing instruction. Subsequently, the gas meter to be tested is subjected to testing, and based on the test result and display data, the reliability score of the gas meter to be tested is assessed. The method achieves a scientifically efficient testing process for the ultrasonic gas meter, thereby reducing a probability of failures occurring during actual use of the ultrasonic gas meter.

DETAILED DESCRIPTION

The accompanying drawings, to be used in the description of the embodiments, will be briefly introduced below, and the accompanying drawings do not represent the entirety of the embodiments.

As used herein, the terms "system," "platform," and/or "module" are used to distinguish between different levels of components, parts, sections, or assemblies. The terms may be replaced by other expressions if other words accomplish the same purpose.

Unless the context explicitly suggests an exception, the words "an," "a" and/or "the" are not specifically singular and may include the plural. Generally, the terms "including" and "comprising" suggest only the inclusion of clearly identified steps and elements. In general, the terms "including" and "comprising" only suggest the inclusion of explicitly identified steps and elements that do not constitute an exclusive list, and the method or apparatus may also include other steps or elements.

When describing the operations performed in the embodiments of the present disclosure, the order of the operations is interchangeable, the operations may be omitted and other operations may be included, if not otherwise specified.

A diaphragm gas meter mainly undergoes basic performance tests such as a flow measurement accuracy test, a meter stability test, and a pressure loss test. An ultrasonic gas meter, with an all-electronic structure, incurs high manual testing costs and low accuracy in error correction when using a conventional manual testing approach for the basic performance tests. In addition to the basic performance tests, the ultrasonic gas meter also needs to be tested for data acquisition and communication functions, such as accuracy in the data transmission and stability in remote transmission. Due to a high precision of the ultrasonic gas meter and its use for measuring gas data, the ultrasonic gas meter is greatly affected by environmental factors such as temperature and gas pressure. Therefore, it is not appropriate to continuously produce ultrasonic gas meters based on a single predetermined test parameter when conducting factory testing.

Some embodiments of the present disclosure provide a method and an industrial Internet of Things (IoT) system for factory testing of an ultrasonic gas meter for smart production. The industrial IoT system may obtain gas meter usage data based on an industrial IoT platform and determine additional testing item(s) or adjust testing plans specifically for different environmental conditions. The industrial IoT system may also determine the additional test item(s) based on user feedback, thereby achieving automated factory testing of the ultrasonic gas meter and ensuring stable use of gas meters in different environmental conditions.

Figure 1:
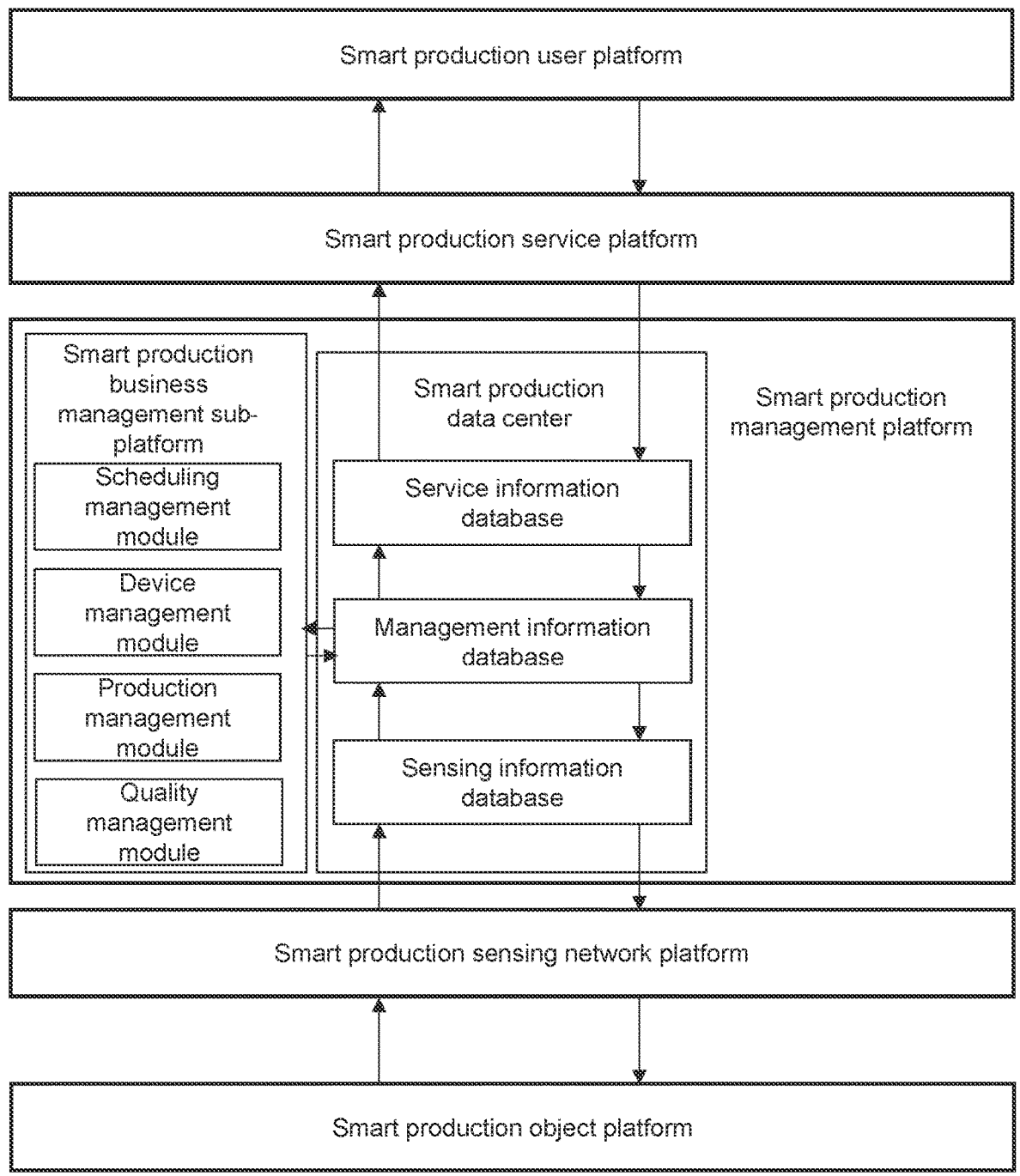
FIG. 1 is a structural diagram illustrating platforms of an industrial Internet of Things (IoT) system for factory testing of an ultrasonic gas meter for smart production according to some embodiments of the present disclosure.

FIG. 1 is a structural diagram of platforms illustrating an industrial Internet of Things (IoT) system for factory testing of an ultrasonic gas meter for smart production according to some embodiments of the present disclosure.

As shown in FIG. 1, the industrial IoT system for factory testing of the ultrasonic gas meter for smart production may include a smart production user platform, a smart production service platform, a smart production management platform, a smart production sensing network platform, and a smart production object platform.

The smart production user platform is a platform for interacting with a user. In some embodiments, the smart production user platform may be configured as a terminal device. In some embodiments, the smart production user platform may send a production test instruction to the smart production service platform.

The smart production service platform is a platform for receiving and transmitting data and/or information. In some embodiments, the smart production service platform may obtain the production test instruction sent by the smart production user platform and upload the production test instruction to the smart production management platform.

The smart production management platform is a platform that coordinates and facilitates connections and collaborations among various functional platforms. The smart production management platform aggregates all information of the industrial IoT system and serves as a platform for providing perceptual management and control management functions for an operation of the industrial IoT system.

In some embodiments, the smart production management platform may include a smart production data center and a smart production business management sub-platform.

The smart production data center is used for storing and managing information about the operation of the industrial IoT system for factory testing of the ultrasonic gas meter for smart production. In some embodiments, the smart production data center may be configured as a storage device for storing data related to the ultrasonic gas meter such as a type of the gas meter, historical application data, or the like.

In some embodiments, the smart production management platform may interact, through the smart production data center, with the smart production service platform and the smart production sensing network platform respectively for information interaction. For example, the smart production data center may send the production test instruction to the smart production sensing network platform.

In some embodiments, the smart production data center may include, but is not limited to, a service information database, a management information database, and a sensing information database. In some embodiments, the smart production data center may store and transmit gas meter-related data based on the various databases.

The smart production business management sub-platform is a platform that manages businesses related with the smart production. In some embodiments, the smart production business management sub-platform may determine a predetermined test parameter based on data provided by the management information database within the smart production data center.

In some embodiments, the smart production business management sub-platform includes but is not limited to a scheduling management module, a device management module, a production management module, and a quality management module. The smart production business management sub-platform may analyze and manage relevant data and information of smart production businesses through the aforementioned management modules.

The smart production sensing network platform is a functional platform for managing sensing communications. In some embodiments, the smart production sensing network platform may realize functions of sensing communications for sensing information and sensing communications for controlling information. In some embodiments, the smart production sensing network platform may be configured as a communication network and a gateway.

The smart production object platform 150 is a functional platform for generating sensing information and executing controlling information. The smart production object platform is configured to monitor and generate operational information about the ultrasonic gas meter. In some embodiments, the smart production object platform may be configured as various types of automatic devices, and the automatic devices may include a production device, a test device, and other devices (such as a monitoring device, etc.).

In some embodiments, the smart production object platform may perform test work based on the production test instruction and send a test result and display data of a gas meter to be tested to the smart production management platform through the smart production sensing network platform.

In some embodiments of the present disclosure, based on the industrial IoT system for factory testing of the ultrasonic gas meter for smart production, a closed loop of information operation may be formed between the smart production object platform and the smart production user platform, allowing for a coordinated and regulated operation under a unified management of the smart production management platform, thereby achieving informatization and intelligence of gas meter factory test management.

Figure 2:
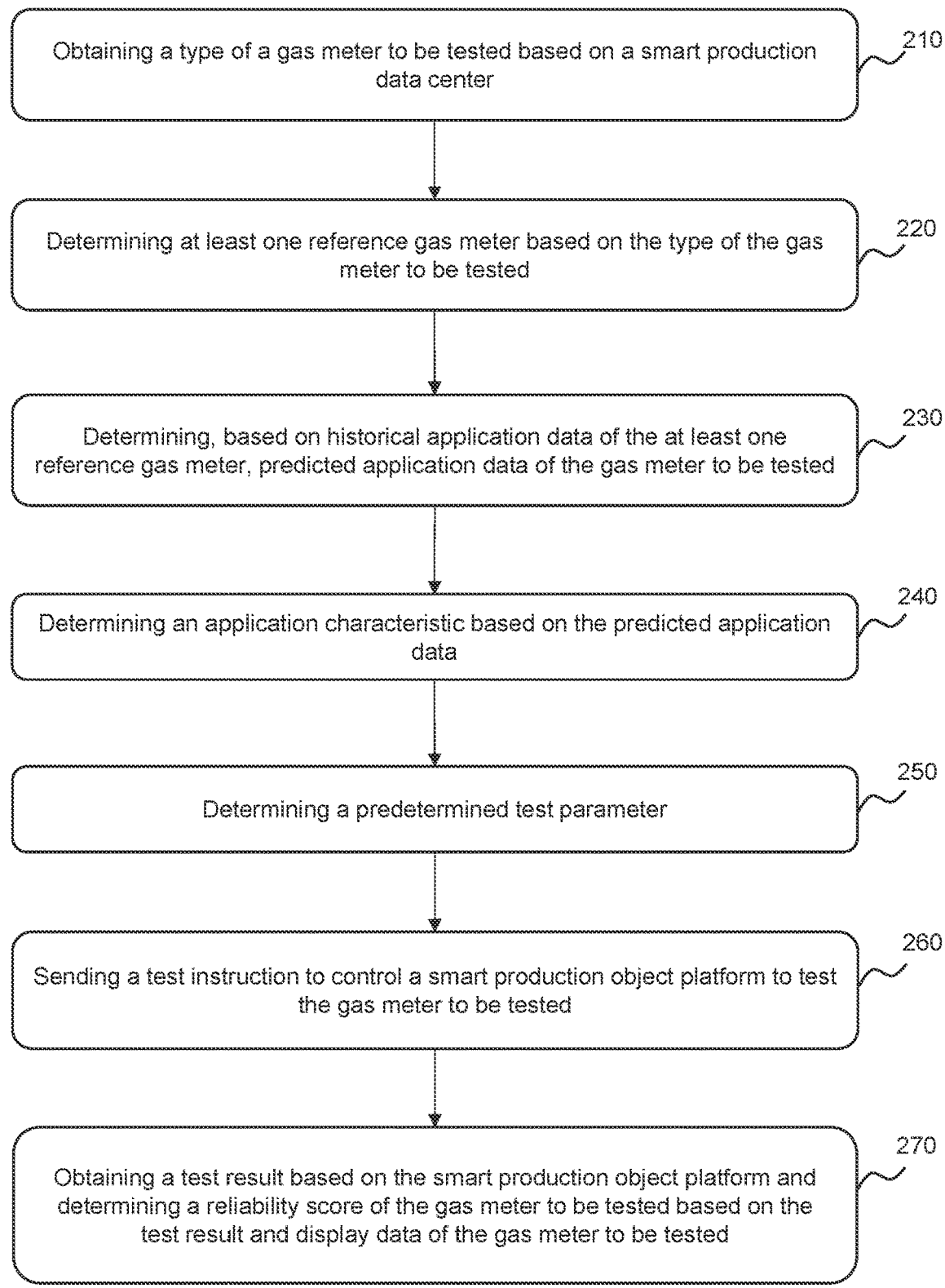
FIG. 2 is a flowchart illustrating an exemplary process of a method for factory testing of an ultrasonic gas meter for smart production according to some embodiments of the present disclosure.
Figure 3:
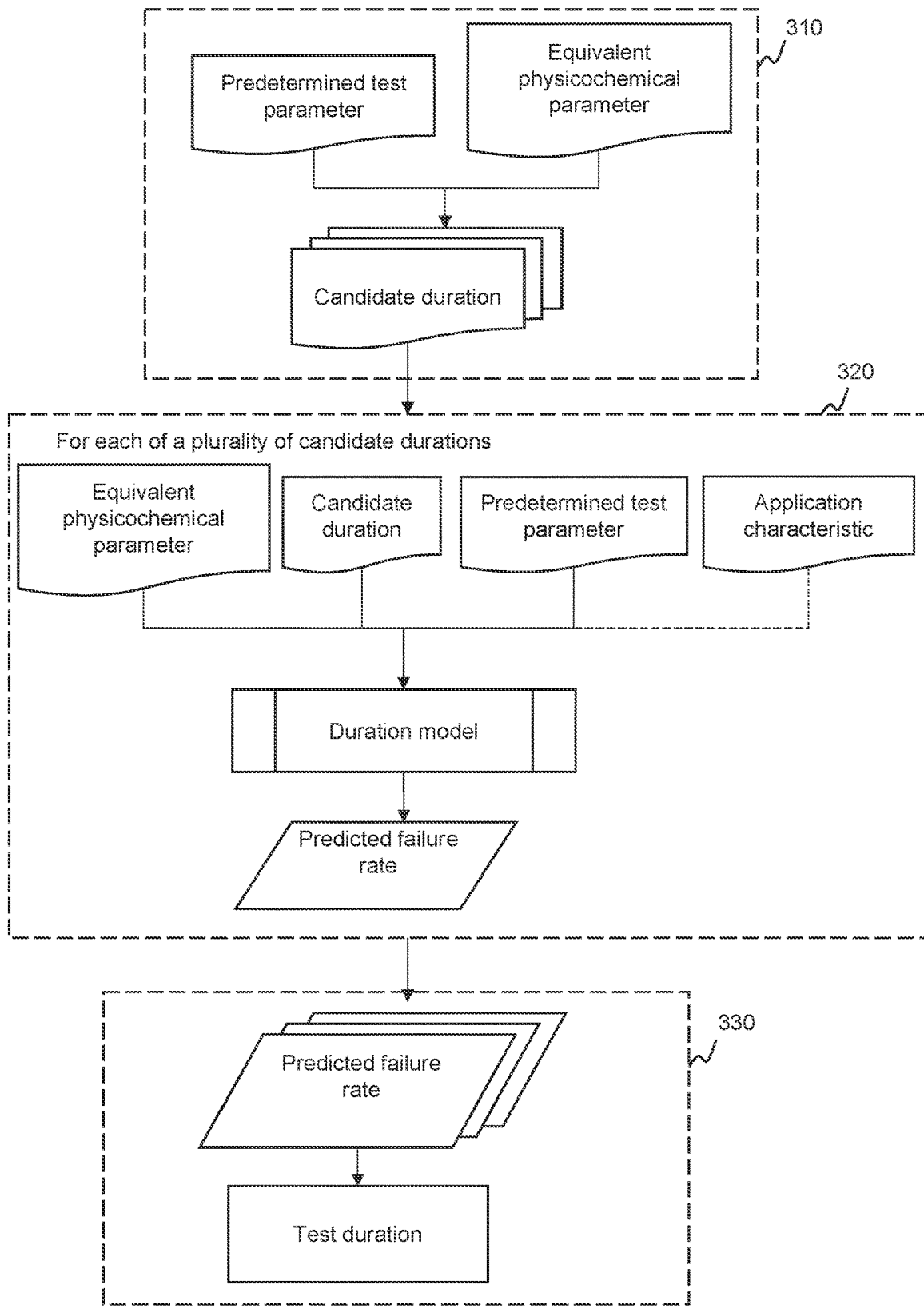
FIG. 3 is a schematic diagram illustrating an exemplary process for determining a test duration according to some embodiments of the present disclosure.

More descriptions regarding the above contents may be found in FIG. 2 and FIG. 3 and the related descriptions thereof.

It should be noted that the above descriptions of the industrial IoT system and the platforms thereof are provided only for descriptive convenience, and do not limit the present disclosure to the scope of the cited embodiments.

FIG. 2 is a flowchart illustrating an exemplary process of a method for factory testing of an ultrasonic gas meter for smart production according to some embodiments of the present disclosure. In some embodiments, a process 200 may be performed by a smart production management platform. As shown in FIG. 2, process 200 may include the following operations.

In 210, a type of a gas meter to be tested may be obtained based on a smart production data center.

The type of the gas meter to be tested refers to different types of gas meters to be tested divided based on a model number, a range, and/or an accuracy. For example, the smart production management platform may classify the gas meter to be tested into different accuracy levels such as grade 2.5, grade 1.5, grade 1.0, or the like, based on the accuracy.

In some embodiments, the smart production management platform may query the smart production data center to obtain the model number, the range, and/or the accuracy of the gas meter to be tested, and based on the above information, retrieve the type of the gas meter to be tested.

In 220, at least one reference gas meter may be determined based on the type of the gas meter to be tested.

The reference gas meter refers to a gas meter of the same type as the gas meter to be tested.

In some embodiments, the smart production management platform may determine the at least one reference gas meter by querying the smart production data center. For example, the smart production management platform may query a gas meter of the same type as the gas meter to be tested based on data stored in the smart production data center and determine the gas meter as the reference gas meter.

In 230, predicted application data of the gas meter to be tested may be determined based on historical application data of the at least one reference gas meter. The historical application data refers to application data related to a historical use process of the at least one reference gas meter. The historical application data includes a historical usage environment and a historical usage intensity.

The predicted application data is predicted application data related to the gas meter to be tested. The predicted application data includes a predicted usage environment and a predicted usage intensity. An amount of predicted application data of the gas meter to be tested is less than or equal to an amount of historical application data of the reference gas meter. That is, the amount of the predicted application data of the gas meter to be tested is less than the amount of the historical application data of the at least one reference gas meter when there is consistency in the historical application data of the at least one reference gas meter, and the amount of the predicted application data of the gas meter to be tested is equal to the amount of the historical application data of the at least one reference gas meter when there is inconsistency in the historical application data of the at least one reference gas meter.

The predicted usage environment is a predicted usage environment of the gas meter to be tested. For example, the predicted usage environment may include (25° C., 45%, C1), (26° C., 40%, C1), (30° C., 48%, C2), etc. In each sequence, a first element represents an average temperature, a second element represents an average humidity, and a third element represents an environmental corrosion rating.

In some embodiments, the smart production management platform may determine the historical usage environment of the at least one reference gas meter as the predicted usage environment.

The predicted usage intensity refers to predicted sequence data characterizing a state of use of the gas meter, such as a sequence of (40 m³/month, 50 m³/month, 60 m³/month . . . ), wherein each element of the sequence represents a gas flow rate determined based on the historical usage intensity of a reference gas meter.

In some embodiments, the predicted usage intensity may be determined based on at least one cumulative metering value of the at least one reference gas meter. For each of the at least one reference gas meter, the greater the cumulative metering value, the greater the predicted usage intensity.

The cumulative metering value is a total volume of gas measured by the reference gas meter over a certain time period. For example, if an average monthly cumulative metering value of a reference gas meter is 50 m³/month, then the predicted usage intensity of the gas meter to be tested is 50 m³/month.

In some embodiments, the smart production management platform may determine a sequence comprising the at least one cumulative metering value of the at least one reference gas meter as the predicted usage intensity.

In some embodiments, the predicted usage intensity may be also related to a predicted usage frequency. The smart production management platform may determine the predicted usage frequency through weighting the at least one cumulative metering value and the predicted usage frequency. The cumulative metering value and the predicted usage frequency are related to a usage service life of the reference gas meter.

The predicted usage frequency is an anticipated count of times the gas meter being used within a certain period. For example, the predicted usage frequency may include a sequence of (100 times/month, 200 times/month, 150 times/month, . . . ), wherein each element of the sequence represents a usage frequency determined based on a historical usage frequency of a reference gas meter.

In some embodiments, the smart production management platform may query the smart production data center to obtain at least one historical usage frequency of the at least one reference gas meter and determine a sequence comprising the at least one historical usage frequency of the at least one reference gas meter as the predicted usage frequency.

In some embodiments, the smart production management platform may take corresponding elements in the sequence comprising the at least one cumulative metering value of at the least one reference gas meter and the sequence comprising the at least one historical usage frequency (i.e., the predicted usage intensity) of the at least one reference gas meter, and determine each element in the sequence of the predicted usage intensity by using the following formula: predicted usage intensity=cumulative metering value×A+ predicted usage frequency×B. A represents a weight of the cumulative metering value and B represents a weight of the predicted usage frequency.

The longer the usage service life of the reference gas meter, the lower values of A and B. Since a longer usage service life of the reference gas meter indicates that there is no need to increase the predicted usage intensity, a traditional predetermined test parameter may ensure a relatively long usage service life. It may be seen from the following descriptions that different predicted usage intensities correspond to different test instructions, and when the predicted usage intensity is higher, additional test item(s) may be added or a test intensity may be increased.

In some embodiments, the smart production management platform may determine the usage service life of the reference gas meter based on the historical application data.

In some embodiments, the smart production management platform may classify the at least one reference gas meter into grades based on a length of the usage service life of the reference gas meter and determine weights corresponding to the grades by checking a table.

In some embodiments of the present disclosure, the predicted usage intensity of the gas meter is determined through weighting based on the cumulative metering value and the predicted usage intensity, and reasonable weights are determined, which can provide an effective data basis for the subsequent determination of a test plan.

In 240, an application characteristic may be determined based on the predicted application data.

The application characteristic refers to an effective characteristic obtained by extracting the predicted application data of a large count of gas meters. The application characteristic may include a usage environment and a usage intensity.

In some embodiments, the smart production management platform may construct feature vectors based on the predicted application data, respectively. Vector elements may include at least a user type, a region to which a user belongs, the predicted usage environment, and the predicted usage intensity. The smart production management platform may first determine a count of clusters through an elbow technique, a profile coefficient optimization technique, an interval count statistics technique, etc., and then perform clustering. After clustering, clusters with a relatively small count of feature vectors may be considered as deviating significantly, and the smart production management platform may remove clusters containing a relatively small count of feature vectors. Next, the smart production management platform may designate the predicted usage environment and the predicted usage intensity of a cluster center of one or more remaining clusters as candidate application characteristics. Alternatively, the smart production management platform may designate an average of the predicted usage intensity and the predicted usage environment for each of the remaining one or more clusters as a candidate application characteristic. There may be one or more candidate application characteristics at this point. The smart production management platform may construct a target vector based on the user type of the gas meter to be tested and the region to which the user belongs, and construct a center vector based on the user type of the center of the one or more remaining cluster and the region to which the user belongs. The smart production management platform may then calculate a distance between the target vector and the center vector and determine a cluster corresponding to a smallest distance as the cluster to which the gas meter to be tested belongs in the one or more remaining clusters. The smart production management platform may determine the candidate application characteristic of the cluster as the application characteristic of the gas meter to be tested.

In 250, a predetermined test parameter may be determined.

The predetermined test parameter refers to a manually predetermined test parameter for the gas meter to be tested. The predetermined test parameter may include a plurality of test items and operating pressure ranges, temperature ranges, and gas flow ranges of the plurality of test items.

In some embodiments, the smart production management platform may determine the predetermined test parameter by querying relevant standard specifications.

In 260, a test instruction may be sent to control a smart production object platform to test the gas meter to be tested.

The test instruction refers to an instruction issued by the smart production management platform to test the gas meter to be tested. The test instruction may include the plurality of test items and one or more of a test parameter, a count of executions, etc., of the plurality of test items. The plurality of test items may include at least a physicochemical characteristic test (e.g., a metrological error test, a pressure loss test, a metrological stability test, a temperature influence test, etc.) and a data transmission test (e.g., a data transmission stability test in a corrosive environment, etc.).

In some embodiments, the smart production management platform may determine the test instruction based on the usage environment and the usage intensity in the application characteristic through an instruction generation model. For example, the smart production management platform may input the usage environment and the usage intensity in the application characteristic into the instruction generation model and output the test instruction from the instruction generation model. The instruction generation model may be a machine learning model. For example, the instruction generation model may include a convolutional neural networks (CNN) model. The smart production management platform may train the instruction generation model using usage environments and usage intensities in historical application characteristics as training data, enabling the instruction generation model to output the corresponding test instruction based on the usage environment and the usage intensity in the application characteristic. Labels corresponding to the training data may be determined by manual input or historical data.

In some embodiments, for each of the plurality of test items, the smart production management platform may determine, based on the application characteristic, an equivalent physicochemical parameter and a test duration of the gas meter to be tested.

The equivalent physicochemical parameter refers to a relevant parameter in the test that is converted equivalently according to an actual usage environment of the gas meter to be tested. The equivalent physicochemical parameter may include at least one of an equivalent usage parameter and an equivalent transmission data.

The equivalent usage parameter refers to the parameter related to the test condition in the test that are equivalently converted according to the actual usage environment of the gas meter to be tested. The equivalent usage parameter may include at least one of an equivalent environment temperature, an equivalent corrosion strength, and an equivalent gas pressure.

The equivalent transmission data refers to an amount of data transmitted by the gas meter, which is equivalently converted based on an actual testing condition of the gas meter to be tested.

In some embodiments, a test intensity of the equivalent physicochemical parameter may be related to a similarity of the application characteristic and conventional application data.

The test intensity refers to a degree of intensity of the gas meter to be tested. The higher the test intensity, the greater a range of a parameter being tested. For example, the higher the test intensity, the testing temperature range becomes broader, the testing pressure range increases, and the amount of tested transmission data becomes larger.

The conventional application data refers to routine universal and representative gas meter application data. For example, in most cases, a gas meter used by a residential user is typically located in a kitchen environment, where there are generally no high temperatures or corrosive gases. Application data of this type of gas meter is referred to as the conventional application data.

In some embodiments, the conventional application data may vary in different regions or at different times. The smart production management platform may obtain the conventional application data for a region by averaging application data of gas meters within the region during a time period.

In some embodiments, the similarity may be determined through calculation. For example, the smart production management platform may calculate a ratio of a usage temperature in the application characteristic to a usage temperature in the conventional application data. The closer the ratio is to 1, the greater the similarity. A ratio that is too large or too small indicates that the usage environment temperature is too high or too low.

In some embodiments, the closer the similarity is to 1, the lower the test intensity. Conversely, the higher the similarity, the greater the test intensity. The further the similarity is from 1, the more adverse the application characteristic of the region, and the corresponding gas meter to be tested in the region may need an increased the test intensity to reduce the probability of problems or failures in a later after-sales service.

In some embodiments of the present disclosure, the test intensity of the equivalent physicochemical parameter may be scientifically and reasonably determined for the gas meter to be tested by determining the similarity between the application characteristic and the conventional application data.

The test duration refers to an amount of time required for the test of the gas meter to be tested. In some embodiments, the smart production management platform may determine a predicted failure rate based on a duration model and then determine the test duration of the gas meter to be tested. More descriptions regarding the determination of the test duration for the gas meter to be tested may be found in FIG. 3 and the related descriptions thereof.

In some embodiments, a test item may be added in response to determining that the application characteristic satisfies a predetermined condition.

In some embodiments, the predetermined condition may include a probability of a harsh usage environment being greater than a probability threshold.

The harsh usage environment refers to a harsh usage environment for a characteristic similar to the application characteristic. For example, the harsh usage environment may include an excessively high temperature, an excessively low temperature, a corrosive gas, or the like.

The characteristic similar to the application characteristic refers to predicted application data corresponding to other feature vectors in the cluster to which the gas meter to be tested belongs during a process of determining the application characteristic. More descriptions regarding the determining process of the application characteristic may be found in operation 240 and the related descriptions thereof.

In some embodiments, the probability of the harsh usage environment is equal to a proportion of a count of the above-mentioned other feature vectors that include the harsh usage environment to a total count of the above-mentioned other feature vectors.

In some embodiments, the smart production management platform may determine the probability threshold based on a failure frequency (i.e., times of failures occurring during per unit of time) of failures occurring in the actual use of gas meters in the region to which the gas meter to be tested belongs. The greater the failure frequency, the lower the probability threshold. For example, the probability threshold may be equal to a standard threshold multiplied by a failure frequency factor. The standard threshold may be preset manually and the failure frequency factor may be inversely proportional to the failure frequency.

The test item may include a regular test item and an additional test item. The additional test item may include a mixture test of pulsed airflow and corrosive gas environment, an external ultrasonic interference test, an overload test of an amount of data transmission, or the like.

In some embodiments, the smart production management platform may look up a table to determine a type of the additional test item based on a type of the harsh usage environment.

In some embodiments of the present disclosure, the smart production management platform may take into account actual usage conditions and actual environmental data of gas meters in different regions, and adopt different test items for the gas meters in different regions in a targeted manner, which can ensure that the gas meters are tested reasonably and reliably and reduce the probability of failures occurring during the subsequent use of the gas meters.

In some embodiments, the predicted application data may further include a usage frequency and a repair frequency, and the test instruction may include at least one test item. The determination of the test instruction may further include determining a count of executions for the plurality of test items based on the application characteristic.

The usage frequency refers to a count of times of the reference gas meter being used in a given time period. The usage frequency may be obtained through the smart production data center.

The repair frequency refers to a count of times of the reference gas meter being reported for repair in the given time period. The repair frequency may be obtained through the smart production data center.

In some embodiments, the smart production management platform may determine a distribution characteristic based on the usage frequency and the repair frequency and determine the application characteristic based on the predicted application data and the distribution characteristic.

The distribution characteristic refers to a distribution of gas meter predicted application data.

In some embodiments, the smart production management platform may obtain gas meters with similar usage frequency and/or repair frequency by querying relevant data in the smart production data center and determine an average distance between the gas meters with similar usage frequency and/or repair frequency to determine the distribution characteristic. If the average distance is relatively small, the distribution is more concentrated (e.g., gas meters in a same industrial park or in a same neighborhood). If the average distance is greater than the preset distance threshold, the distribution is more spread out. If the average distance is greater than a preset distance threshold, the distribution is more spread out. The average distance may be a Euclidean distance, and the preset distance threshold may be manually preset in advance. The gas meters with similar usage frequency and/or repair frequency are gas meters whose distances from the usage frequency and/or repair frequency of the gas meter to be tested are within a preset similar distance. The preset similar distance may be manually preset in advance.

In some embodiments, if gas meters that are frequently reported for repair due to malfunctions are distributed in the same region (e.g., within the same industrial park or in the same neighborhood), it may be caused by other factors within the region. If gas meters that are reported for repair for a same type of malfunction are more widely distributed, it may be attributed to issues with the gas meters.

In some embodiments, the smart production management platform may construct feature vectors based on the predicted application data, respectively. Vector elements may include at least a user type, a user region, the usage environment, the usage intensity, and the distribution characteristic. Next, the application characteristic may be determined in the manner as described in operation 240.

In some embodiments of the present disclosure, the smart production management platform may determine the application characteristic based on the distribution characteristic of the gas meter during use, and then determine a reasonable count of executions, thereby ensuring the reliability of the testing and reducing testing costs.

In some embodiments, the smart production management platform may determine the count of executions for the plurality of test items based on the application characteristic through table lookup.

In some embodiments of the present disclosure, the smart production management platform may determine the count of executions for the plurality of test items based on the application characteristic and may synthesize results of multiple tests to determine whether the gas meter is qualified, ensuring the reliability of the gas meter test.

In 270, a test result may be obtained based on the smart production object platform and a reliability score of the gas meter to be tested may be determined based on the test result and display data of the gas meter to be tested.

The test result refers to actual test parameter(s) of the gas meter to be tested during the testing process. For example, the test result may include a gas flow rate, a gas pressure, or the like. The test result may be obtained based on sensors and uploaded to the smart production object platform.

The display data refers to data displayed by the gas meter to be tested during the testing process. For example, the display data may include the gas flow rate, the gas pressure, or the like. The display data may be read directly from the gas meter to be tested.

The reliability score refers to data that characterizes an accuracy of the display data of the gas meter to be tested.

In some embodiments, the smart production management platform may determine the reliability score by comparing a percentage of difference between the display data and the test result. The smaller the percentage difference, the higher the reliability score. For example, the smart production management platform may calculate the percentage of difference between the display data and the test result, and determine the reliability score of the gas meter to be tested by using formula (1):

$$S = 100(1-T) \tag{1}$$

Wherein S denotes the reliability score and T denotes the percentage of difference between the display data and the test result, i.e., an absolute value of the display data minus test data, divided by the test data.

In some embodiments of the present disclosure, the smart production management platform may determine the application characteristic based on the predicted application data and then determine the reasonable test instruction. Subsequently, the smart production management platform may perform testing on the gas meter to be tested and assess the reliability score of the gas meter to be tested based on the test result and the display data, thereby achieving scientific and efficient testing of the gas meter to be tested and reducing the probability of failures during actual use of the gas meter.

FIG. 3 is a schematic diagram illustrating an exemplary process for determining a test duration according to some embodiments of the present disclosure. In some embodiments, a process 300 may be performed by a smart production management platform. As shown in FIG. 3, process 300 may include the following operations.

In 310, a plurality of candidate durations may be determined based on a predetermined test parameter and an equivalent physicochemical parameter.

A candidate duration refers to time data to be determined as the test duration.

In some embodiments, the smart production management platform may construct a feature vector based on the predetermined test parameter and the equivalent physicochemical parameter and obtain a candidate duration by matching the feature vector with a vector database, thereby determining the plurality of candidate durations. The vector database includes a plurality of reference vectors. The plurality of reference vectors are constructed based on test parameters and equivalent physicochemical parameters in historical application data. Specifically, by calculating a distance between the feature vector and the reference vector, a duration corresponding to the reference vector with a distance less than a preset threshold is selected as the candidate duration. The preset threshold may be set artificially. Subsequently, based on the above candidate duration and a preset step size, the smart production management platform may determine the plurality of candidate durations. For example, if one determined candidate duration is t and the preset step size is a, the plurality of candidate durations may be t−2a, to−a, t, t+a, and t+2a.

In some embodiments, the smart production management platform may determine a predicted failure rate for each of the plurality of candidate durations. The smart production management platform may determine, for each of the plurality of candidate durations, the predicted failure rate based on the manner in operation 320.

In 320, for each of the plurality of candidate durations, the predicted failure rate may be determined by using a duration model based on the candidate duration, the equivalent physicochemical parameter, the predetermined test parameter, and the application characteristic.

The duration model may be a machine learning model. For example, the duration model may be a deep neural networks (DNN) model, a convolutional neural networks (CNN) model, or any combination thereof.

The predicted failure rate refers to a predicted probability of a gas meter failure. More descriptions regarding the equivalent physicochemical parameter, the predetermined test parameter, and the application characteristic may be found in FIG. 2 and the related descriptions thereof.

In some embodiments, an input of the duration model may include a distribution characteristic.

The distribution characteristic refers to a distribution of usage data of an ultrasonic gas meter. In some embodiments, the distribution characteristic may include a usage frequency distribution and a repair frequency distribution of the ultrasonic gas meter. More descriptions regarding the distribution characteristic t may be found in FIG. 2 and the related descriptions thereof.

In order to ensure the reliability of testing for the ultrasonic gas meter, the smart production object platform may perform multiple tests on a same test item and synthesize test results of the multiple tests to determine whether the ultrasonic gas meter is qualified. However, to avoid unnecessary additional testing leading to increased human and time costs, the smart production management platform may determine a reasonable count of tests based on the distribution characteristic during the use of the ultrasonic gas meter, thereby achieving reliable testing while reducing testing costs.

In some embodiments, the duration model may be obtained by training a first training sample with a first label. The first training sample may include a sample application characteristic, a sample predetermined test parameter, a sample equivalent physicochemical parameter, and a sample predetermined duration. In some embodiments, the first training sample may also include a sample distribution characteristic. In some embodiments, the first label may be annotated based on a probability of failures/problems in the historical application data of the ultrasonic gas meter. For example, in the historical application data, if the probability of failures/problems corresponding to the test duration is relatively low, the first label may be labeled as 0; if the probability of failures/problems corresponding to the test duration is relatively high, the first label may be labeled as 1.

In some embodiments, the smart production management platform may optimize the model via a loss function. Specifically, the smart production management platform may construct the loss function based on an output of the model and the first label. When the loss function converges or satisfies a condition, a trained duration model may be obtained. A parameter for training the model may be used as a parameter of the duration model and the trained duration model may be obtained.

In some embodiments, the loss function may include a first loss term and a second loss term. The loss function may be determined based on the first loss term, the second loss term, a weight of the first loss term, and a weight of the second loss term. The first loss term characterizes a difference between the predicted failure rate of the output of the duration model and the first label. The second loss term characterizes a mean value of differences between predicted failure rates output by the model corresponding to different preset durations and first labels, reflecting an accuracy difference of the model's output for different input data. The weights may be determined based on a magnitude of the mean value of the differences in the second loss term. The larger the mean value of the differences, the larger the weight of the second loss term and the smaller the weight of the first loss term. In some embodiments, during the training process, the smart production management platform may dynamically adjust the weight of the first loss term and the weight of the second loss term based on the output of the model.

In 330, the test duration may be determined based on a plurality of predicted failure rates for the plurality of candidate durations.

In some embodiments, the smart production management platform may determine the test duration in various ways. For example, the smart production management platform may select the plurality of candidate durations for which the plurality of predicted failure rates meet a preset condition and take an average of the plurality of candidate durations as the test duration. The preset condition may include the plurality of predicted failure rates being less than a specified failure rate threshold, which may be set manually based on requirements. As another example, to conserve resources and improve testing efficiency, the smart production management platform may select a shortest preset duration among the plurality of candidate durations for which the plurality of predicted failure rates meet the preset condition as the test duration.

Determining the plurality of predicted failure rates for the plurality of candidate durations through the duration model and subsequently determining the test duration not only conserves resources and enhances testing efficiency but also ensures a reasonable testing duration. By evaluating a difference between a predicted result of the duration model and an actual value through the loss function, and quantifying the difference into a numerical value, adjustments may be made to optimize the parameter of the duration model. Furthermore, reasonableness and reliability of ultrasonic gas meter testing can be ensured, and the probability of failures occurring during the subsequent usage of the ultrasonic gas meter can be reduced.

Some embodiments of the present disclosure provide a non-transitory computer-readable storage medium storing one or more computer instructions. When a computer reads the one or more computer instructions from the storage medium, the computer implements the method for factory testing of the ultrasonic gas meter for smart production described in any of the embodiments of the present disclosure.

The basic concepts have been described above, and it is apparent that to a person skilled in the art, the above detailed disclosure is intended as an example only and does not constitute a limitation of the present disclosure. Although not expressly stated herein, various modifications, improvements, and amendments may be made to the present disclosure by those skilled in the art. Such modifications, improvements, and amendments are suggested in the present disclosure, so such modifications, improvements, and amendments remain within the spirit and scope of the exemplary embodiments of the present disclosure.

Also, the present disclosure uses specific words to describe the embodiments of the present disclosure. For example, "an embodiment," "one embodiment," and/or "some embodiments" are meant to refer to a certain feature, structure, or characteristic associated with at least one embodiment of the present disclosure. Accordingly, it should be emphasized and noted that "an embodiment" or "one embodiment" or "an alternative embodiment" mentioned two or more times in different places in the present disclosure do not necessarily refer to the same embodiment. Furthermore, certain features, structures, or characteristics in one or more embodiments of the present disclosure may be suitably combined.

Furthermore, unless expressly stated in the claims, the order of processing elements and sequences, the use of numerical letters, or the use of other names described herein are not intended to limit the order of the processes and methods of the present disclosure. Although a number of embodiments of the present disclosure currently considered useful are discussed in the above disclosure by way of various examples, it should be understood that such details serve illustrative purposes only, and that additional claims are not limited to the disclosed embodiments; rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the present disclosure, and thus aid in the understanding of one or more embodiments of the present disclosure, the preceding description of embodiments of the present disclosure sometimes combines multiple features into a single embodiment, accompanying drawings, or description thereof. However, this way of disclosure does not imply that the subject matter of the present disclosure requires more features than those mentioned in the claims. Rather, claimed subject matter may lie in less than all features of a single foregoing disclosed embodiment.

In some embodiments, numeric values describing the composition and quantity of attributes are used in the description. It should be understood that such numeric values used for describing embodiments may be modified with qualifying terms such as "about," "approximately," or "generally." Unless otherwise stated, "about," "approximately," or "generally" indicates that a variation of ±20% is permitted in the described numbers. Accordingly, in some embodiments, the numerical parameters used in the disclosure and claims are approximations, which can change depending on the desired characteristics of the individual embodiment. In some embodiments, the numerical parameters should take into account a specified number of valid digits and employ a general manner of bit retention. Although the numerical ranges and parameters used in some embodiments of the present disclosure to confirm the breadth of the range are approximations, in specific embodiments, such numerical values are set as precisely as practicable.

With respect to each of the patents, patent applications, publications of patent applications, and other material, such as articles, books, specifications, publications, documents and the like, cited in the present disclosure, the entire contents thereof are hereby incorporated herein by reference. Application history documents that are inconsistent with the contents of the present disclosure or that create conflicts are excluded, as are documents (currently or hereafter appended to the present disclosure) that limit the broadest scope of the claims of the present disclosure. It should be noted that in the event of any inconsistency or conflict between the descriptions, definitions, and/or use of terminology in the materials appended to the present disclosure and the contents described herein, the descriptions, definitions, and/or use of terminology in the present disclosure shall prevail.

Finally, it should be understood that the embodiments described in the present disclosure are used only to illustrate the principles of the embodiments of the present disclosure. Other deformations may also fall within the scope of the present disclosure. Therefore, by way of example and not limitation, alternative configurations of the embodiments disclosed in the present disclosure may be considered consistent with the teachings of the present disclosure. Accordingly, the embodiments described in the present disclosure are not limited to the explicitly introduced and described embodiments in the present disclosure.

What is claimed is:

1. A method for factory testing of a gas meter for production, wherein the method is implemented by a production management platform, the production management platform comprises a production data center, and the method comprises:

obtaining a type of a gas meter to be tested based on the production data center, wherein the type of the gas meter to be tested refers to different types of gas meters to be tested divided based on at least one of a model number, a range, or an accuracy;

determining at least one reference gas meter based on the type of the gas meter to be tested;

determining, based on historical application data of the at least one reference gas meter, predicted application data of the gas meter to be tested, the predicted application data including at least one of a predicted usage environment and a predicted usage intensity, the predicted usage intensity being determined based on at least one cumulative metering value of the at least one reference gas meter;

determining an application characteristic based on the predicted application data;

determining a predetermined test parameter, the predetermined test parameter including a plurality of test items and operating pressure ranges, temperature ranges, and gas flow ranges of the plurality of test items;

issuing a test instruction to control a production object platform to test the gas meter to be tested, the test instruction being determined based on the application characteristic and the predetermined test parameter, the test including at least one of a physicochemical characteristic test and a data transmission test; and obtaining a test result based on the production object platform and determining a reliability score of the gas meter to be tested based on the test result and display data of the gas meter to be tested.

2. The method of claim 1, wherein the predicted usage intensity is further related to a predicted usage frequency and a determination of the predicted usage intensity includes:

determining the predicted usage intensity through weighting the at least one cumulative metering value and the predicted usage frequency, wherein a weight of the at least one cumulative metering value and a weight of the predicted usage frequency are related to a usage service life of the at least one reference gas meter.

3. The method of claim 1, wherein a determination of the test instruction includes:

for each of the plurality of test items, determining an equivalent physicochemical parameter and a test duration of the gas meter to be tested based on the application characteristic, the equivalent physicochemical parameter including at least one of an equivalent usage parameter and an equivalent transmission data, the equivalent usage parameter including at least one of an equivalent environmental temperature, an equivalent corrosion strength, and an equivalent gas pressure.

4. The method of claim 3, wherein a test intensity of the equivalent physicochemical parameter is related to a similarity between the application characteristic and conventional application data.

5. The method of claim 3, wherein a determination of the test duration includes:

determining a plurality of candidate durations based on the predetermined test parameter and the equivalent physicochemical parameter;

for each of the plurality of candidate durations, determining, based on the candidate duration, the equivalent physicochemical parameter, the predetermined test parameter and the application characteristic, a predicted failure rate using a duration model, the duration model being a machine learning model; and determining the test duration based on a plurality of predicted failure rates for the plurality of candidate durations.

6. The method of claim 5, wherein an input of the duration model includes a distribution characteristic.

7. The method of claim 3, wherein the determination of the test instruction further includes:

adding a test item in response to determining that the application characteristic satisfies a predetermined condition.

8. The method of claim 7, wherein the predetermined condition includes:

a probability of a harsh usage environment being greater than a probability threshold, the harsh usage environment referring to a harsh usage environment for a characteristic similar to the application characteristic.

9. The method of claim 1, wherein the predicted application data further includes a usage frequency and a repair frequency, and a determination of the test instruction further includes:

determining a count of executions for the plurality of test items based on the application characteristic.

10. The method of claim 9, wherein the determining an application characteristic based on the predicted application data includes:

determining a distribution characteristic based on the usage frequency and the repair frequency; and determining the application characteristic based on the predicted application data and the distribution characteristic.

11. An industrial Internet of Things (IoT) system for factory testing of a gas meter for production, comprising a production user platform, a production service platform, a production management platform, a production sensing network platform, and a production object platform interacting in sequence, wherein the production management platform is configured to perform operations including:

obtaining a type of a gas meter to be tested based on a production data center, wherein the type of the gas meter to be tested refers to different types of gas meters to be tested divided based on at least one of a model number, a range, or an accuracy;

determining at least one reference gas meter based on the type of the gas meter to be tested;

determining, based on historical application data of the at least one reference gas meter, predicted application data of the gas meter to be tested, the predicted application data including at least one of a predicted usage environment and a predicted usage intensity, the predicted usage intensity being determined based on at least one cumulative metering value of the at least one reference gas meter;

determining an application characteristic based on the predicted application data; determining a predetermined test parameter, the predetermined test parameter including a plurality of test items and operating pressure ranges, temperature ranges, and gas flow ranges of the plurality of test items;

issuing a test instruction to control the production object platform to test the gas meter to be tested, the test instruction being determined based on the application characteristic and the predetermined test parameter, the test including at least one of a physicochemical characteristic test and a data transmission test, and obtaining a test result based on the production object platform and determining a reliability score of the gas meter to be tested based on the test result and display data of the gas meter to be tested.

12. The industrial IoT system of claim 11, wherein the production management platform includes a production business management sub-platform and the production data center, the production business management sub-platform interacts bi-directionally with the production data center, and the production business management sub-platform obtains data from the production data center and feedback corresponding operation information.

13. The industrial IoT system of claim 11, wherein the predicted usage intensity is further related to a predicted usage frequency, and the production management platform is further configured to perform operations including:

determining the predicted usage intensity through weighting the at least one cumulative metering value and the predicted usage frequency, wherein a weight of the at least one cumulative metering value and a weight of the predicted usage frequency are related to a usage service life of the at least one reference gas meter.

14. The industrial IoT system of claim 11, wherein production management platform is further configured to perform operations including:

for each of the plurality of test items,
determining an equivalent physicochemical parameter and a test duration of the gas meter to be tested based on the application characteristic, the equivalent physicochemical parameter including at least one of an equivalent usage parameter and an equivalent transmission data, the equivalent usage parameter including at least one of an equivalent environmental temperature, an equivalent corrosion strength, and an equivalent gas pressure.

15. The industrial IoT system of claim 14, wherein a test intensity of the equivalent physicochemical parameter is related to a similarity between the application characteristic and conventional application data.

16. The industrial IoT system of claim 14, wherein the production management platform is further configured to perform operations including:
determining a plurality of candidate durations based on the predetermined test parameter and the equivalent physicochemical parameter;
for each of the plurality of candidate durations,
determining, based on the candidate duration, the equivalent physicochemical parameter, the predetermined test parameter and the application characteristic, a predicted failure rate using a duration model, the duration model being a machine learning model; and
determining the test duration based on a plurality of predicted failure rates for the plurality of candidate durations.

17. The industrial IoT system of claim 16, wherein an input of the duration model includes a distribution characteristic.

18. The industrial IoT system of claim 14, wherein the production management platform is further configured to perform operations including:
adding a test item in response to determining that the application characteristic satisfies a predetermined condition.

19. The industrial IoT system of claim 18, wherein the preset condition includes:
a probability of a harsh usage environment being greater than a probability threshold, the harsh usage environment referring to a harsh usage environment for a characteristic similar to the application characteristic.

20. A non-transitory computer-readable storage medium storing one or more computer instructions, wherein when a computer reads the one or more computer instructions from the storage medium, the computer executes a method for factory testing of a gas meter for production, the method comprising:
obtaining a type of a gas meter to be tested based on a production data center, wherein the type of the gas meter to be tested refers to different types of gas meters to be tested divided based on at least one of a model number, a range, or an accuracy;
determining at least one reference gas meter based on the type of the gas meter to be tested;
determining, based on historical application data of the at least one reference gas meter, predicted application data of the gas meter to be tested, the predicted application data including at least one of a predicted usage environment and a predicted usage intensity, the predicted usage intensity being determined based on at least one cumulative metering value of the at least one reference gas meter;
determining an application characteristic based on the predicted application data;
determining a predetermined test parameter, the predetermined test parameter including a plurality of test items and operating pressure ranges, temperature ranges, and gas flow ranges of the plurality of test items;
issuing a test instruction to control a production object platform to test the gas meter to be tested, the test instruction being determined based on the application characteristic and the predetermined test parameter, the test including at least one of a physicochemical characteristic test and a data transmission test; and
obtaining a test result based on the production object platform and determining a reliability score of the gas meter to be tested based on the test result and display data of the gas meter to be tested.

* * * * *